(12) United States Patent
Kumar et al.

(10) Patent No.: US 8,478,062 B2
(45) Date of Patent: Jul. 2, 2013

(54) REDUCING SIGNAL-DEPENDENT NOISE IN DIGITAL CAMERAS

(75) Inventors: Mrityunjay Kumar, Rochester, NY (US); Rodney L. Miller, Fairport, NY (US)

(73) Assignee: Apple Inc., Cupertino, CA (US)

( * ) Notice: Subject to any disclaimer, the term of this patent is extended or adjusted under 35 U.S.C. 154(b) by 755 days.

(21) Appl. No.: 12/607,347

(22) Filed: Oct. 28, 2009

(65) Prior Publication Data
US 2011/0096205 A1    Apr. 28, 2011

(51) Int. Cl.
*G06K 9/40* (2006.01)

(52) U.S. Cl.
USPC ............................ 382/260; 382/254; 382/264

(58) Field of Classification Search
USPC .................................................. 382/254–275
See application file for complete search history.

(56) References Cited

U.S. PATENT DOCUMENTS

| | | | | |
|---|---|---|---|---|
| 5,790,709 | A  * | 8/1998 | Kopeika et al. | 382/254 |
| 6,907,144 | B1 * | 6/2005 | Gindele | 382/275 |
| 6,999,634 | B2 * | 2/2006 | Hong | 382/275 |

OTHER PUBLICATIONS

Sendur, Bivariate Shrinkage Functions for Wavelet-Based Denoising Exploiting Interscale Dependency, IEEE Transactions on Signal Processing, vol. 50, No. 11.*
Rudin et al., in the article "Nonlinear total variation based noise removal algorithms" (Physica D, vol. 60, pp. 259-268, 1992).
Foi et al., in the article "Pointwise shape-adaptive DCT for high-quality denoising and deblocking of grayscale and color images" (IEEE Transactions on Image Processing, vol. 16, pp. 1395-1411, May 2007).
Coifman et al., in the article "Translation-invariant de-noising" (Lecture Notes in Statistics: Wavelets and Statistics, Springer Verlag, New York, pp. 125-150, 1995).
Hirakawa et al., in the article "Image denoising for signal-dependent noise" (IEEE International Conference on Acoustics, Speech, and Signal Processing, vol. 2, pp. 29-32, 2005).
"Convergence of the alternating minimization algorithm for blind deconvolution" by Chan et al. (Linear Algebra Appl., vol. 316, pp. 259-285, 2000).

* cited by examiner

*Primary Examiner* — Alex Liew
(74) *Attorney, Agent, or Firm* — Wong, Cabello, Lutsch, Rutherford & Brucculeri LLP

(57) ABSTRACT

A method for producing a noise-reduced digital image captured using a digital imaging system having signal-dependent noise characteristics, comprising: capturing one or more noisy digital images of a scene, wherein said at least one noisy digital image has signal-dependent noise characteristics; defining a functional relationship to relate the noisy digital images to a noise-reduced digital image, wherein the functional relationship includes at least two sets of unknown parameters, and wherein at least one of the sets of unknown parameters relates to the signal-dependent noise characteristics; defining an energy function responsive to the functional relationship which includes at least a data fidelity term to enforce similarities between the noisy digital images and the noise-reduced digital image, and a spatial fidelity term to encourage sharp edges in the noise-reduced digital image; and using an optimization process to determine a noise-reduced image responsive to the energy function.

19 Claims, 4 Drawing Sheets

REDUCING SIGNAL-DEPENDENT NOISE IN DIGITAL CAMERAS

FIELD OF THE INVENTION

This invention relates generally to the field of denoising digital images, and more particularly to a method to denoise digital images having signal-dependent noise.

BACKGROUND OF THE INVENTION

Digital images captured by digital cameras are corrupted by "noise," wherein noise can be defined as unwanted random variations in the digital image. Noise can arise from a number of sources such as sensor shot noise and fixed-pattern noise. The amount of noise in a digital image can depend on many factors such as sensor design, exposure level, and digital image processing applied to the image. Denoising algorithms are often used to "denoise" captured digital images (i.e., reduce the level of noise) in order to improve the signal-to-noise (SNR) ratio of the captured digital images. Noise in digital camera images generally depends on the signal level (i.e., the image pixel values); this type of noise is commonly referred to as "signal-dependent noise." Traditional denoising algorithms assume the level of noise to be independent of the image pixel values. As a result, such algorithms are inadequate to deal with signal-dependent noise.

One method described by Rudin et al., in the article "Nonlinear total variation based noise removal algorithms" (Physica D, Vol. 60, pp. 259-268, 1992) uses total variation minimization to generate denoised image.

Another method taught by Foi et al., in the article "Pointwise shape-adaptive DCT for high-quality denoising and deblocking of grayscale and color images" (IEEE Transactions on Image Processing, Vol. 16, pp. 1395-1411, May 2007) analyzes noisy image using a shape-adaptive discrete cosine transform (DCT).

Coifman et al., in the article "Translation-invariant denoising" (Lecture Notes in Statistics: Wavelets and Statistics, Springer Verlag, New York, pp. 125-150, 1995) use translation invariant thresholding of the wavelet coefficients of the noisy image to produce a denoised image.

All of the above denoising algorithms assume noise to be independent of the image pixel values and are therefore inadequate to deal with signal-dependent noise.

Hirakawa et al., in the article "Image denoising for signal-dependent noise" (IEEE International Conference on Acoustics, Speech, and Signal Processing, Vol. 2, pp. 29-32, 2005) teaches a rather elegant signal-dependent denoising technique. In this approach, the total least square (TLS) approach is used for modeling the uncertainties in the noisy image and to reduce the signal-dependent noise. However, this approach is computationally demanding and too slow for many applications.

Thus, there exists a need for an efficient signal-dependent denoising algorithm that preserves salient features of the image.

SUMMARY OF THE INVENTION

The present invention represents a method for producing a noise-reduced digital image captured using a digital imaging system having signal-dependent noise characteristics, comprising using a digital processor to perform at least some of the steps of:

a) capturing one or more noisy digital images of a scene, wherein said at least one noisy digital image has signal-dependent noise characteristics;

b) defining a functional relationship to relate the one or more noisy digital images to a noise-reduced digital image estimate, wherein the functional relationship includes at least two sets of unknown parameters, and wherein at least one of the sets of unknown parameters relates to the signal-dependent noise characteristics;

c) defining an energy function responsive to the functional relationship which includes at least:
   i) a data fidelity term to enforce similarities between the one or more noisy digital images and the noise-reduced digital image estimate; and
   ii) a spatial fidelity term to encourage sharp edges in the noise-reduced digital image estimate; and d) using an optimization process to determine a noise-reduced image responsive to the energy function.

It is an advantage of the present invention that it deals with signal-dependent noise in digital images, which is more realistic for digital camera applications as compared to traditional signal-independent noise models.

It is an additional advantage that by using a spatial penalty term, the resulting noise-reduced image preserves the salient features with improved accuracy.

It is a further advantage of the present invention that it can process multiple captures of the scene having signal-dependent noise, which enables the noise to be reduced with improved accuracy.

In addition to the embodiments described above, further embodiments will become apparent by reference to the drawings and by study of the following detailed description.

BRIEF DESCRIPTION OF THE DRAWINGS

The present invention will be more readily understood from the detailed description of exemplary embodiments presented below considered in conjunction with the attached drawings, of which.

DETAILED DESCRIPTION OF THE INVENTION

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular and/or plural in referring to the "method" or "methods" and the like is not limiting.

The phrase, "digital content record", as used herein, refers to any digital content record, such as a digital still image, a digital audio file, a digital video file, etc.

It should be noted that, unless otherwise explicitly noted or required by context, the word "or" is used in this disclosure in a non-exclusive sense.

Figure 1:
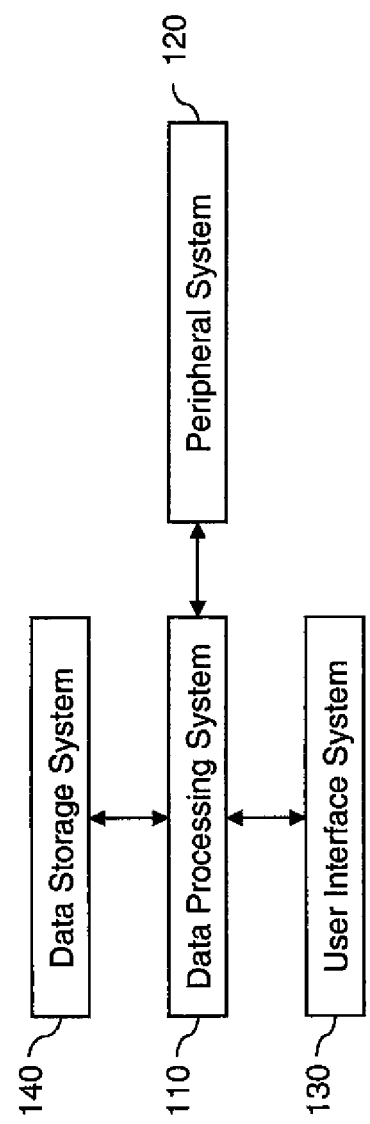
FIG. 1 is a high-level diagram showing the components of a system for denoising digital image according to an embodiment of the present invention.

FIG. 1 is a high-level diagram showing the components of a system for image denoising according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

Figure 2:
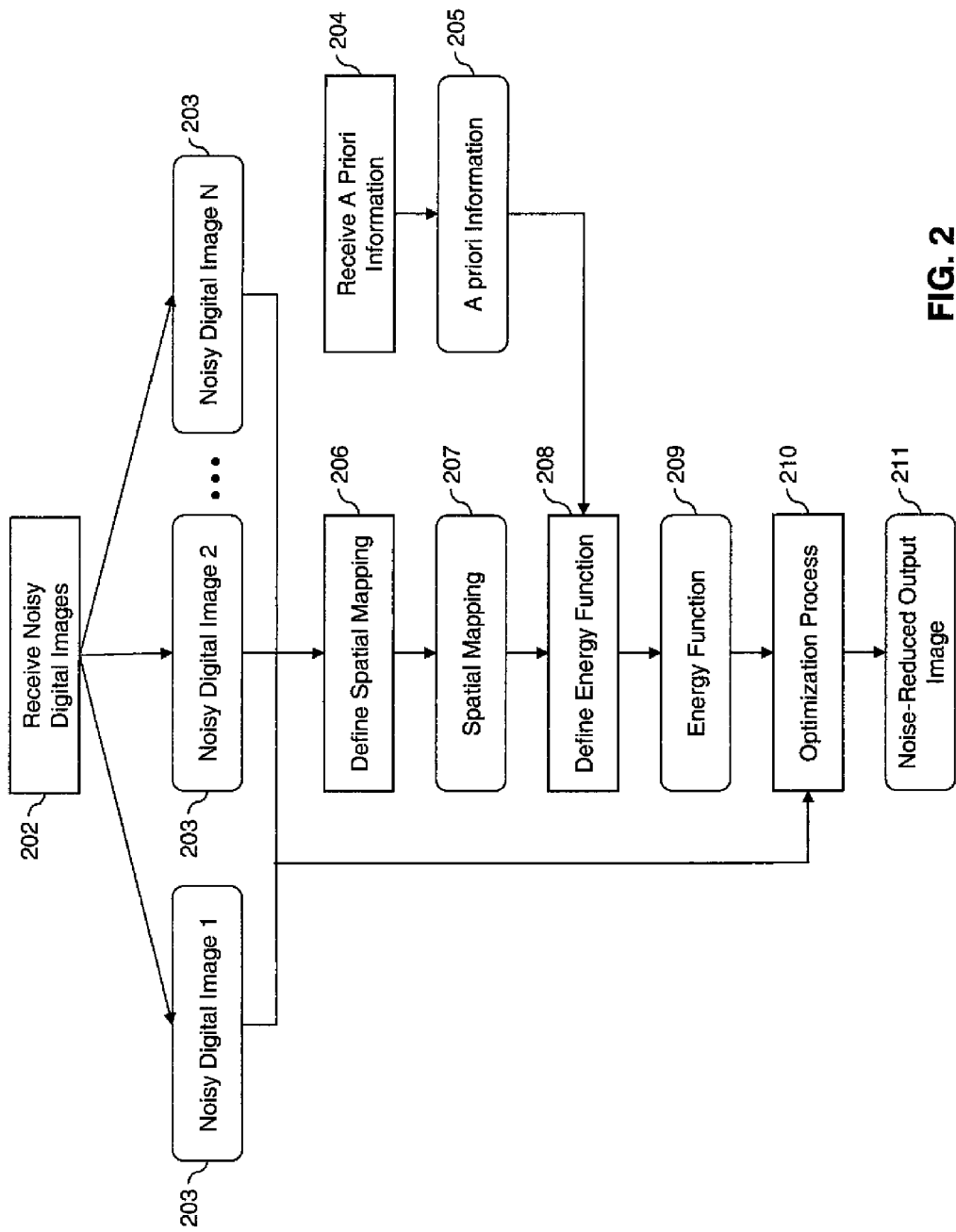
FIG. 2 is a flow diagram illustrating a method for producing a noise-reduced digital image according to an embodiment of the present invention.
Figure 3:
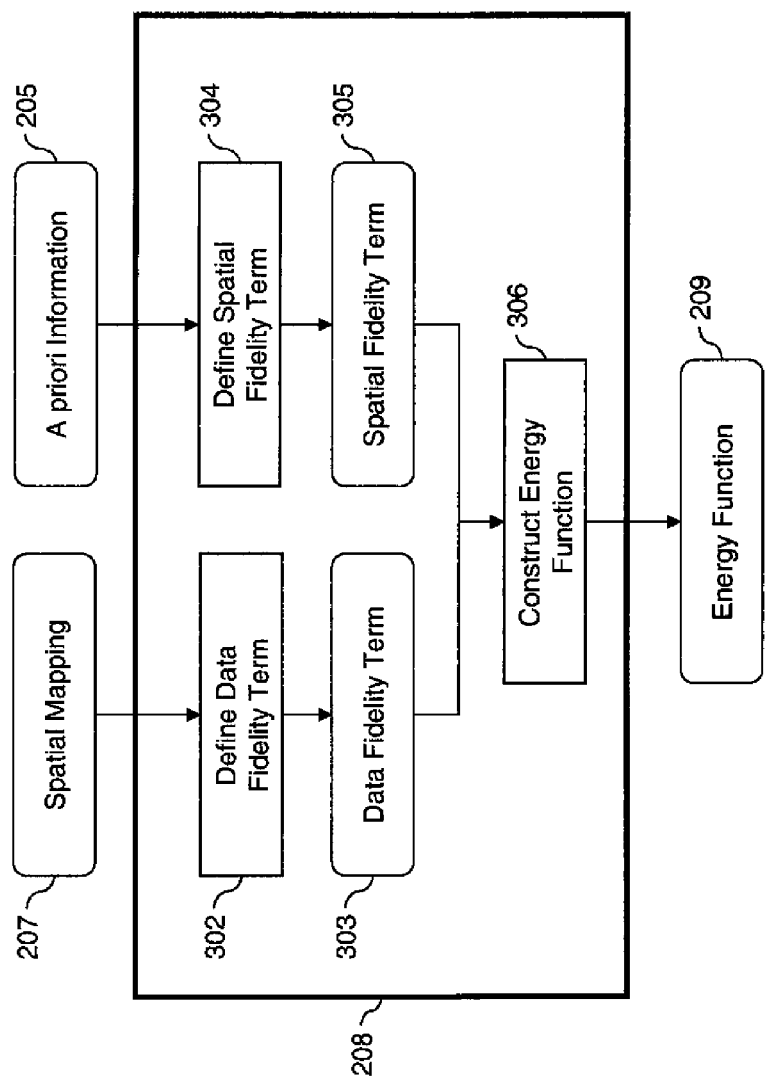
FIG. 3 is a block diagram showing the define energy function step of FIG. 2 in more detail.
Figure 4:
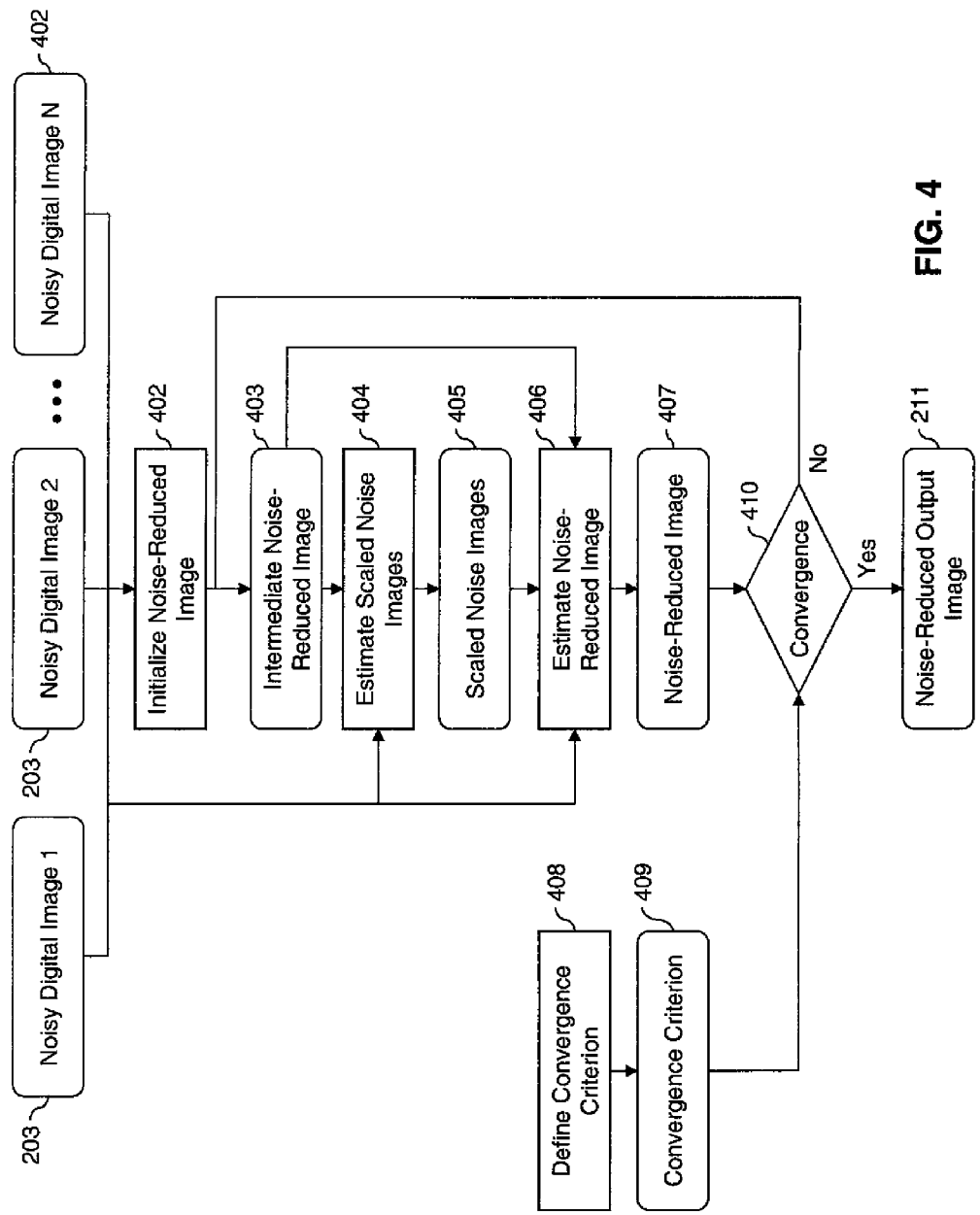
FIG. 4 is a flow diagram illustrating a method for producing a noise-reduced digital image according to an alternate embodiment of the present invention.

The data processing system 110 includes one or more data processing devices that implement the processes of the various embodiments of the present invention, including the example processes of FIGS. 2-4 described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes of FIGS. 2-4 described herein. The data storage system 140 may be a distributed processor-accessible memory system including multiple processor-accessible memories communicatively connected to the data processing system 110 via a plurality of computers and/or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated.

The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

FIG. 2 is a flow diagram illustrating a method for producing a noise-reduced digital image according to an embodiment of the present invention from a set of one or more noisy digital images captured using a digital imaging system having signal-dependent characteristics. One or more noisy digital images 203 representing a scene and having signal-dependent noise characteristics are received in receive noisy digital images step 202. The noisy digital images 203 can be captured by a digital camera or a scanner. Alternatively, they may be frames of a video sequence captured by a video camera.

A priori information 205 is received in receive a priori information step 204. The a priori information 205 contains the prior information about the content of a noise-reduced output image 211 that is to be produced according to the method of the present invention. The a priori information 205 will be discussed in more detail later. A define spatial mapping step 206 defines a spatial mapping 207. The spatial mapping 207 is a functional relationship relating the one or more noisy digital images 203 to the noise-reduced output image 211. A define energy function step 208 uses the spatial mapping 207 to compute an energy function 209. In the art, energy functions 209 are sometimes called optimization functions or cost functions. Finally, an optimization process step 210 uses the one or more noisy digital images 203 and the energy function 209 to produce the noise-reduced output image 211.

The individual steps outlined in FIG. 2 will now be described in greater detail. The define spatial mapping step 206 defines a spatial mapping 207, which is a functional relationship relating the one or more noisy digital images 203 to the noise-reduced output image 211. The spatial mapping 207 can be defined in any appropriate way known to those skilled in the art. One way to define the spatial mapping 207 according to a preferred embodiment of the present invention is using the following equation:

$$I_k(x,y)=I_0(x,y)+K_0+K_1I_0(x,y))\eta_k(x,y) \quad (1)$$

where $I_k(x,y)$ is a pixel value of the $k^{th}$ noisy digital images 203 at pixel location (x,y), $\eta_k(x,y)$ is a unit amplitude random noise function for the $k^{th}$ noisy digital images 203 at pixel location (x,y), and $I_0(x,y)$, $K_0$ is a constant relating to the signal-independent noise amplitude, and $K_1$ is a constant relating to the signal-dependent noise amplitude. (This spatial mapping is similar to one defined by Hirakawa et al., in the aforementioned article "Image denoising for signal-dependent noise.)"

The spatial mapping 207 given in Eq. (1) can be rearranged as follows:

$$I_k(x,y)=\beta_k(x,y)I_0(x,y)+K_0\eta_k(x,y) \quad (2)$$

where $\beta_k(x,y)=1+K_1\eta_k(x,y)$ incorporates the signal-dependent noise characteristics. The individual equations for each of the noisy digital images 203 can be combined into vector form to yield:

$$\underline{I}(x,y)=\underline{\beta}(x,y)I_0(x,y)+K_0\underline{\eta}(x,y) \qquad (3)$$

where I(x,y) is a vector of the pixels from the one or more noisy digital images 203 at pixel location (x,y), $\underline{\eta}(x,y)$ is a function parameter vector of the random noise functions at pixel location (x,y), and $\underline{\beta}(x,y)$ is a function parameter vector relating to the signal-dependent noise characteristics The function parameter vector $\underline{\beta}(x,y)$ can be expressed by the following equation:

$$\underline{\beta}(x,y)=\underline{1}+K_1\underline{\eta}(x,y) \qquad (4)$$

where 1 is a vector containing all 1s.

FIG. 3 is a more detailed view of the define energy function step 208 shown in FIG. 2 according to a preferred embodiment of the present invention. A define data fidelity term step 302 defines a data fidelity term 303 responsive to the spatial mapping 207. The data fidelity term 303 enforces similarities between the noisy digital images 203 (FIG. 2) and the noise-reduced output image 211 (FIG. 2). The data fidelity term 303 can be defined in any appropriate way known to those skilled in the art. One way to define the data fidelity term 303 according to a preferred embodiment of the present invention can be described using the following equation:

$$DF(x,y)=(\underline{\beta}(x,y)I_0(x,y)-\underline{I}(x,y))^t(\underline{\beta}(x,y)I_0(x,y)-\underline{I}(x,y)) \qquad (5)$$

where DF(x,y) is the value of the data fidelity term 303 at pixel location (x,y), and $(\bullet)^t$ denotes a transpose operation.

A define spatial fidelity term step 304 uses the a priori information 205 to define a spatial fidelity term 305. The spatial fidelity term 305 encourages sharp edges in the noise-reduced output image 211 (FIG. 2). The spatial fidelity term 305 can be defined in any appropriate way known to those skilled in the art. One way to compute the spatial fidelity term 305 according to a preferred embodiment of the present invention is to make use of the a priori information 205 that noise-reduced images will generally contain smooth image regions separated by edges having high spatial frequency content. It is well known in the art that a spatial fidelity term can be defined in accordance with this a priori information using a total variation regularization technique. (For example, see the aforementioned article by Rudin et al., entitled "Nonlinear total variation based noise removal algorithms") According to this approach, the spatial fidelity term 305 can be defined using the following equation:

$$SF(x,y)=\int\int_{x,y}|\nabla I_0(x,y)|dxdy \qquad (6)$$

where SF(x,y) is the value of the spatial fidelity term 305 at pixel location (x,y), and $\nabla I_0(x,y)$ is the gradient of the noise-reduced output image 211 (FIG. 2) at pixel location (x,y).

A construct energy function step 306 combines the data fidelity term 303 and the spatial fidelity term 305 to construct the energy function 209. The construct energy function step 306 can be performed in any appropriate way known to those skilled in the art. One way to construct an energy function 209 with the construct energy function step 306 according to a preferred embodiment of the present invention can be described using the following equation:

$$g(I_0(x,y),\underline{\beta}(x,y),\lambda,\alpha,\gamma)= \qquad (7)$$
$$\frac{\lambda}{2}(\underline{\beta}(x,y)I_0(x,y)-\underline{I}(x,y))^t(\underline{\beta}(x,y)I_0(x,y)-\underline{I}(x,y))+$$
$$\alpha\int\int_{x,y}|\nabla I_0(x,y)|dxdy+\frac{\gamma}{2}(\underline{\beta}(x,y))^t(\underline{\beta}(x,y))$$

where $g(I_0(x,y),\underline{\beta}(x,y),\lambda,\alpha,\gamma)$ is the energy function 209, and $\lambda$, $\alpha$ and $\gamma$ are weighting parameters. The weighting parameter $\lambda$ is used to weight the data fidelity term, and the weighting parameter $\alpha$ is used to weight the spatial fidelity term. The weighting parameter $\gamma$ is used to weight an optional third term which encourages $\underline{\beta}(x,y)$ to be smooth.

The optimization process step 210 of FIG. 2 uses the energy function 209 and the one or more noisy digital images 203 to produce the noise-reduced output image 211. The optimization process step 210 can be performed in any appropriate way known to those skilled in the art. Conceptually, the optimization process step 210 determines a noise-reduced image by evaluating the energy function to select between candidate noise-reduced images. The candidate noise reduced image having the lowest value of the energy function is selected. In a preferred embodiment of the present invention, an alternating minimization algorithm is applied to minimize the energy function 209, $g(I_0(x,y),\underline{\beta}(x,y),\lambda,\alpha,\gamma)$. Alternating minimization algorithms are well-known in the optimization art. For example, see "Convergence of the alternating minimization algorithm for blind deconvolution" by Chan et al. (Linear Algebra Appl., Vol. 316, pp. 259-285, 2000). The values of the weighting parameters $\lambda$, $\alpha$ and $\gamma$ are set to predetermined values and the alternating minimization algorithm is used to determine the $\underline{\beta}(x,y)$ and $I_0(x,y)$ values that minimize the energy function 209. In a preferred embodiment of the present invention, the alternating minimization algorithm uses a steepest descent optimization to determine $I_0(x,y)$. When the optimization process step 210 converges, the determined value of $I_0(x,y)$ is selected as the noise-reduced output image 211.

FIG. 4 is a flow diagram illustrating a method for producing the noise-reduced output image 211 according to an alternate embodiment of the present invention. An initialize noise-reduced image step 402 is used to initialize an intermediate noise-reduced image 403. The initialization of the intermediate noise-reduced image 403 can be performed in any appropriate way known to those skilled in the art. In a preferred embodiment of the present invention, the intermediate noise-reduced image 403 is initialized by setting it equal to the average of the one or more noisy digital images 203.

An estimate scaled noise images step 404 uses the intermediate noise-reduced image 403 and the one or more noisy digital images 203 to produce a corresponding set of one or more scaled noise images 405. The scaled noise images 405 can be computed in any appropriate way known to those skilled in the art. One way to compute the scaled noise images 405 according to a preferred embodiment of the present invention can be described using the following equation:

$$\underline{SN}(x,y)=\left(\frac{I_{INR}(x,y)}{(I_{INR}(x,y))^2+\frac{\gamma}{\lambda}}\right)\underline{I}(x,y) \qquad (8)$$

where $\underline{SN}(x,y)$ is a vector of the pixel values of the scaled noise images 405 at pixel location (x,y), $I_{INR}(x,y)$ is the value of the intermediate noise-reduced image 403 at pixel location (x,y) and I(x,y), λ, and γ have been defined earlier. This equation follows from the definition of the energy function defined in Eq. (7) using derivations that are well-known in the optimization art. It can be obtained by taking the derivative of Eq. (7) with respect to $\underline{\beta}(x,y)$, then setting it equal to zero and solving for $\underline{\beta}(x,y)$.

An estimate noise reduced image step 406 uses the intermediate noise-reduced image 403, the one or more scaled noise images 405 and the one or more noisy digital images 203 to produce a noise-reduced image 407. The noise-reduced image 407 can be computed in any appropriate way known to those skilled in the art. One way to compute the noise-reduced image 407 according to a preferred embodiment of the present invention can be described using the following equation:

$$I_{NR}(x, y) = I_{INR}(x, y) + \tau[\lambda(\underline{SN}(x, y))^t(I(x, y) - \underline{SN}(x, y)I_{INR}(x, y))] + \alpha \nabla \cdot \left(\frac{\nabla I_{INR}(x, y)}{|\nabla I_{INR}(x, y)|}\right) \quad (9)$$

where $I_{NR}(x,y)$ and $I_{INR}(x,y)$ are pixel values of noise-reduced image 407 and intermediate noise-reduced image 403, respectively, at pixel location (x,y), τ and α are empirically determined weighting parameters, "•" represents the dot product, "|•|" is the absolute value operator, and ∇ is the gradient operator. This equation also follows from the definition of the energy function defined in Eq. (7). It can be obtained by taking the derivative of Eq. (7) with respect to $I_0(x,y)$, then setting the derivative equal to zero and applying a gradient descent method A define convergence criterion step 408 specifies a convergence criterion 409 to terminate the algorithm. The convergence criterion 409 can be determined in any appropriate way known to those skilled in the art. In a preferred embodiment of the present invention, the convergence criterion 409 is satisfied when the algorithm is repeated for a predetermined number of iterations. Alternate forms of convergence criteria are well known to those skilled in the art. As an example, the convergence criterion 409 can specify that the algorithm is terminated if the mean square difference between the intermediate noise-reduced image 403 and the noise-reduced image 407 is less than a predetermined threshold. Alternatively, the convergence criterion 409 can specify that the algorithm is terminated if the mean square difference between the intermediate noise-reduced image 403 and the noise-reduced image 407 is less than a predetermined threshold, but is terminated after the algorithm is repeated for a predetermined number of iterations even if the mean square difference condition is not satisfied.

The convergence test 410 checks whether the convergence criterion 409 is satisfied. If the convergence criterion 409 is satisfied then the algorithms is terminated and the noise-reduced image 407 is selected as the final noise-reduced output image 211. Otherwise, the intermediate noise-reduced image 403 is set to be equal to the noise-reduced image 407 and the entire process is repeated until the convergence criterion is satisfied.

In a preferred embodiment of the present invention, a plurality of noisy digital images 203 are used to determine the noise-reduced output image 211. This has the advantage that it provides multiple instances of the image noise, and therefore provides information that is useful to reduce the noise. The plurality of images is preferably captured sequentially during a short time interval in order to minimize any relative motion between the digital camera and objects in the scene. In the case where there may be some amount of relative motion between the times that the noisy digital images 203 are captured, the noisy digital images 203 can be spatially registered first and the proposed invention can then be applied to the registered images. The image registration can be performed in any appropriate way known to those skilled in the art. In a preferred embodiment of the present invention, the image registration is performed by selecting one of the noisy digital images 203 as a reference digital image and applying translation, rotation or scaling operations to the other noisy digital images 203 to align them with the reference digital image. In cases where the images contain moving objects, only portions of the digital images may be misaligned. In this case, one or more subsets of image pixels that are misaligned can be determined and appropriate translation, rotation or scaling operations can be applied to each subset of image pixels.

In another embodiment of the present invention, only a single noisy digital image 203 is used in the determination of the noise-reduced output image 211. The same basic methods described with reference to FIGS. 2 and 4 can be applied even with a single noisy digital image 203. While it is more convenient to use only a single noisy digital image 203 in many cases, the quality of the resulting noise-reduced output images 211 is generally inferior to those obtained using multiple noisy digital images 203.

It is to be understood that the exemplary embodiments disclosed herein are merely illustrative of the present invention and that many variations of the above-described embodiments can be devised by one skilled in the art without departing from the scope of the invention. It is therefore intended that all such variations be included within the scope of the following claims and their equivalents.

PARTS LIST

110 Data processing system
120 Peripheral system
130 User interface system
140 Data storage system
202 Receive noisy digital images step
203 Noisy digital images
204 Receive a priori information step
205 A priori information
206 Define spatial mapping step
207 Spatial mapping
208 Define energy function step
209 Energy function
210 Optimization process step
211 Noise-reduced output image
302 Define data fidelity term step
303 Data fidelity term
304 Define spatial fidelity term step
305 Spatial fidelity term
306 Construct energy function step
402 Initialize noise-reduced image step
403 Intermediate noise-reduced image
404 Estimated scaled noise images step
405 Scaled noise images
406 Estimate noise-reduced image step
407 Noise-reduced image
408 Define convergence criterion step
409 Convergence criterion
410 Convergence test

What is claimed is:
1. A method for producing a noise-reduced digital image captured using a digital imaging system having signal-depen- dent noise characteristics, comprising using a digital processor to perform at least some of the steps of:

a) capturing one or more noisy digital images of a scene, wherein said at least one noisy digital image has signal-dependent noise characteristics;

b) defining a functional relationship to relate the one or more noisy digital images to a noise-reduced digital image estimate, wherein the functional relationship includes at least two sets of unknown parameters, and wherein at least one of the sets of unknown parameters relates to the signal-dependent noise characteristics, wherein the functional relationship is:

$$\underline{I}(x,y) = \underline{\beta}(x,y) I_0(x,y) + \underline{\eta}(x,y)$$

where $\underline{I}(x,y)$ is a vector of pixels from the one or more noisy digital images at pixel location (x,y), $\underline{\beta}(x,y)$ and $\underline{\eta}(x,y)$ are function parameter vectors at pixel location (x,y), and $I_0(x,y)$ is the noise-reduced digital image estimate at pixel location (x,y), and wherein $\underline{\beta}(x,y)$ relates to the signal-dependent noise characteristics;

c) defining an energy function responsive to the functional relationship which includes at least:
  i) a data fidelity term to enforce similarities between the one or more noisy digital images and the noise-reduced digital image estimate; and
  ii) a spatial fidelity term to encourage sharp edges in the noise-reduced digital image estimate; and d) using an optimization process to determine a noise-reduced image responsive to the energy function.

2. The method of claim 1 wherein $\underline{\beta}(x,y)$ has the form:

$$\underline{\beta}(x,y) = \underline{1} + K_1 \underline{\eta}(x,y)$$

where $K_1$ is a parameter relating to the amplitude of the signal dependent noise, and $\underline{1}$ is a vector containing all 1s.

3. The method of claim 1 wherein the data fidelity term is defined by $$(\underline{\beta}(x,y) I_0(x,y) - \underline{I}(x,y))^t (\underline{\beta}(x,y) I_0(x,y) - \underline{I}(x,y))$$

where $(\ )^t$ denotes a transpose operation.

4. The method of claim 1 wherein the spatial fidelity term is defined by $$\int\int_{x,y} |\nabla I_0(x,y)| dx dy$$

where $|\nabla I_0(x,y)|$ is the absolute value of the gradient of the noise-reduced digital image estimate at pixel location (x,y).

5. The method of claim 1 wherein the energy function $g(I_0(x,y), \underline{\beta}(x,y), \lambda, \alpha, \gamma)$ is defined by:

$$g(I_0(x,y), \underline{\beta}(x,y), \lambda, \alpha, \gamma) =$$
$$\frac{\lambda}{2}(\underline{\beta}(x,y)I_0(x,y) - \underline{I}(x,y))^t(\underline{\beta}(x,y)I_0(x,y) - \underline{I}(x,y)) +$$
$$\alpha \int\int_{x,y} |\nabla I_0(x,y)| dx dy + \frac{\gamma}{2}(\underline{\beta}(x,y))^t(\underline{\beta}(x,y))$$

where $\lambda$, $\alpha$ and $\gamma$ are weighting parameters.

6. The method of claim 5 wherein the optimization of the energy function includes utilizing an alternating minimization algorithm on $g(I_0, \underline{\beta}, \lambda, \alpha, \gamma)$.

7. The method of claim 6 wherein the alternating minimization algorithm includes a steepest descent optimization.

8. The method of claim 1 further including the step of spatially registering the captured noisy digital images prior to determining the noise-reduced image.

9. The method of claim 8 wherein the step of spatially registering the captured noisy digital images includes selecting one captured noisy digital image as a reference digital image and applying translation, rotation or scaling operations to the other captured noisy digital images to align them with the reference digital image.

10. The method of claim 9 wherein the translation, rotation or scaling operations are applied to subsets of the image pixels in the other captured noisy digital images when only portions of the captured noisy digital images are misaligned.

11. The method of claim 1 wherein the one or more digital images are captured using a digital camera.

12. A method for producing a noise-reduced digital image captured using a digital imaging system having signal-dependent noise characteristics, comprising using a digital processor to perform at least some of the steps of:

a) capturing a plurality of digital images of a scene;

b) computing a noise-reduced image by combining the plurality of captured digital images;

c) determining estimates of scaled noise images for the plurality of digital images responsive to the captured digital images and the noise reduced image using the following equation:

$$\underline{SN}(x,y) = \left(\frac{I_{INR}(x,y)}{(I_{INR}(x,y))^2 + \frac{\gamma}{\lambda}}\right) \underline{I}(x,y)$$

where $\underline{I}(x,y)$ is a vector of pixels from the one or more noisy digital images at pixel location (x,y), $\underline{SN}(x,y)$ is the vector of the pixel values of the scaled noise images at pixel location (x,y), $I_{INR}(x,y)$ is the value of the intermediate noise-reduced image at pixel location (x,y) and $\lambda$, are $\gamma$ weighting parameters;

d) computing an updated noise-reduced image responsive to the previous noise-reduced image, the captured digital images, and the estimated scaled noise images;

e) computing updated estimates of the scaled noise images responsive to the captured digital images and the updated noise reduced image; and f) repeating steps d) and e) until a convergence criterion is satisfied.

13. The method of claim 12 wherein the step of combining the plurality of captured digital images includes averaging the plurality of captured digital images.

14. The method of claim 12 wherein the updated noise-reduced image is calculated using the following equation:

$$I_{NR}(x,y) = I_{INR}(x,y) + \tau[\lambda(\underline{SN}(x,y))^t(\underline{I}(x,y) - \underline{SN}(x,y)I_{INR}(x,y))] + \alpha \nabla \cdot \left(\frac{\nabla I_{INR}(x,y)}{|\nabla I_{INR}(x,y)|}\right)$$

where $I_{NR}(x,y)$ and $I_{INR}(x,y)$ are pixel values of noise-reduced image and intermediate noise-reduced image, respectively, at pixel location (x,y), $\tau$, and $\alpha$ are weighting parameters, "●" represents the dot product, "|•|" is the absolute value operator, and $\nabla$ is the gradient operator.

15. The method of claim 12 wherein the convergence criteria is based on performing a predefined number of iterations.

16. The method of claim 12 wherein the convergence criteria is based on a mean squared difference between noise-reduced images for two successive iterations.

17. The method of claim 16 wherein the convergence criteria further includes a predefined maximum number of iterations.

18. A method for producing a noise-reduced digital image captured using a digital imaging system having signal-dependent noise characteristics, comprising using a digital processor to perform at lest some of the steps of:
   a) capturing one or more noisy digital images of a scene, wherein said at least one noisy digital image has signal-dependent noise characteristics;
   b) defining a functional relationship to relate the one or more noisy digital images to a noise-reduced digital image estimate, wherein the functional relationship includes at least two sets of unknown parameters, and wherein at least one of the sets of unknown parameters relates to the signal-dependent noise characteristics, wherein the functional relationship is:

$$\underline{I}(x,y)=\underline{\beta}(x,y)I_0(x,y)+\underline{\eta}(x,y)$$

where $I(x,y)$ is a vector of pixels from the one or more noisy digital images at pixel location $(x,y)$, $\underline{\beta}(x,y)$ and $\underline{\eta}(x,y)$ are function parameter vectors at pixel location $(x,y)$, and $I_0(x,y)$ is the noise-reduced digital image estimate at pixel location $(x,y)$, and wherein $\underline{\beta}(x,y)$ relates to the signal-dependent noise characteristics;
   c) defining an energy function responsive to the functional relationship which includes at least:
      i) a data fidelity term to enforce similarities between the one or more noisy digital images and the noise-reduced digital image estimate; and
      ii) a spatial penalty term to encourage sharp edges in the noise-reduced digital image estimate; and
   d) determining a noise-reduced image by evaluating the energy function to select between candidate noise-reduced images.

19. A system comprising:
a data processing system; and
a memory system communicatively connected to the data processing system and storing instructions configured to cause the data processing system to implement a method for producing a noise-reduced digital image captured using a digital imaging system having signal-dependent noise characteristics, wherein the instructions comprise:
   a) capturing one or more noisy digital images of a scene, wherein said at least one noisy digital image has signal-dependent noise characteristics;
   b) defining a functional relationship to relate the one or more noisy digital images to a noise-reduced digital image estimate, wherein the functional relationship includes at least two sets of unknown parameters, and wherein at least one of the sets of unknown parameters relates to the signal-dependent noise characteristics, wherein the functional relationship is:

$$\underline{I}(x,y)=\underline{\beta}(x,y)I_0(x,y)+\underline{\eta}(x,y)$$

where $I(x,y)$ is a vector of pixels from the one or more noisy digital images at pixel location $(x,y)$, $\underline{\beta}(x,y)$ and $\underline{\eta}(x,y)$ are function parameter vectors at pixel location $(x,y)$, and $I_0(x,y)$ is the noise-reduced digital image estimate at pixel location $(x,y)$, and wherein $\underline{\beta}(x,y)$ relates to the signal-dependent noise characteristics;
   c) defining an energy function responsive to the functional relationship which includes at least:
      i) a data fidelity term to enforce similarities between the one or more noisy digital images and the noise-reduced digital image estimate; and
      ii) a spatial fidelity term to encourage sharp edges in the noise-reduced digital image estimate; and
   d) using an optimization process to determine a noise-reduced image responsive to the energy function.

* * * * *